Patented Feb. 5, 1952

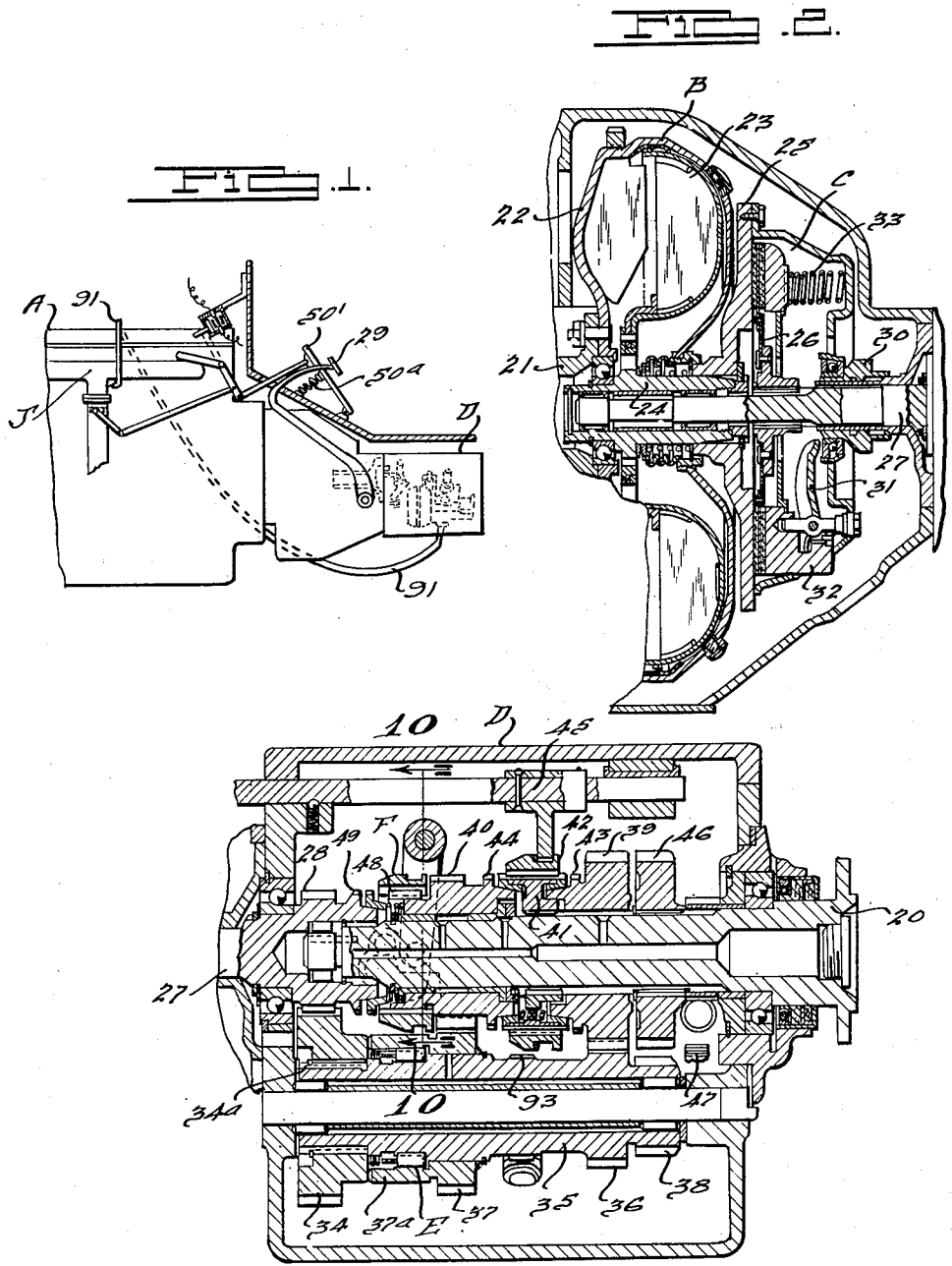

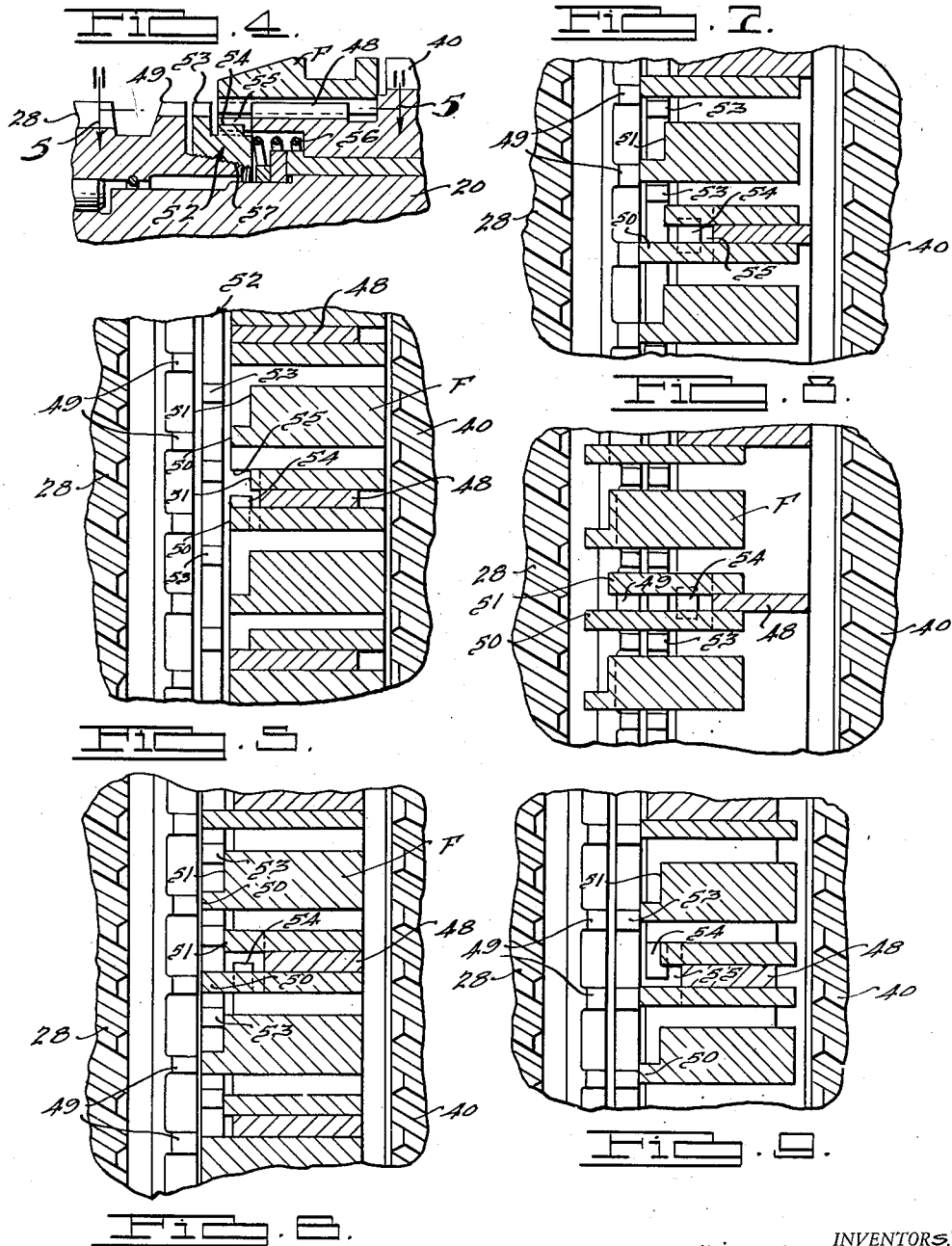

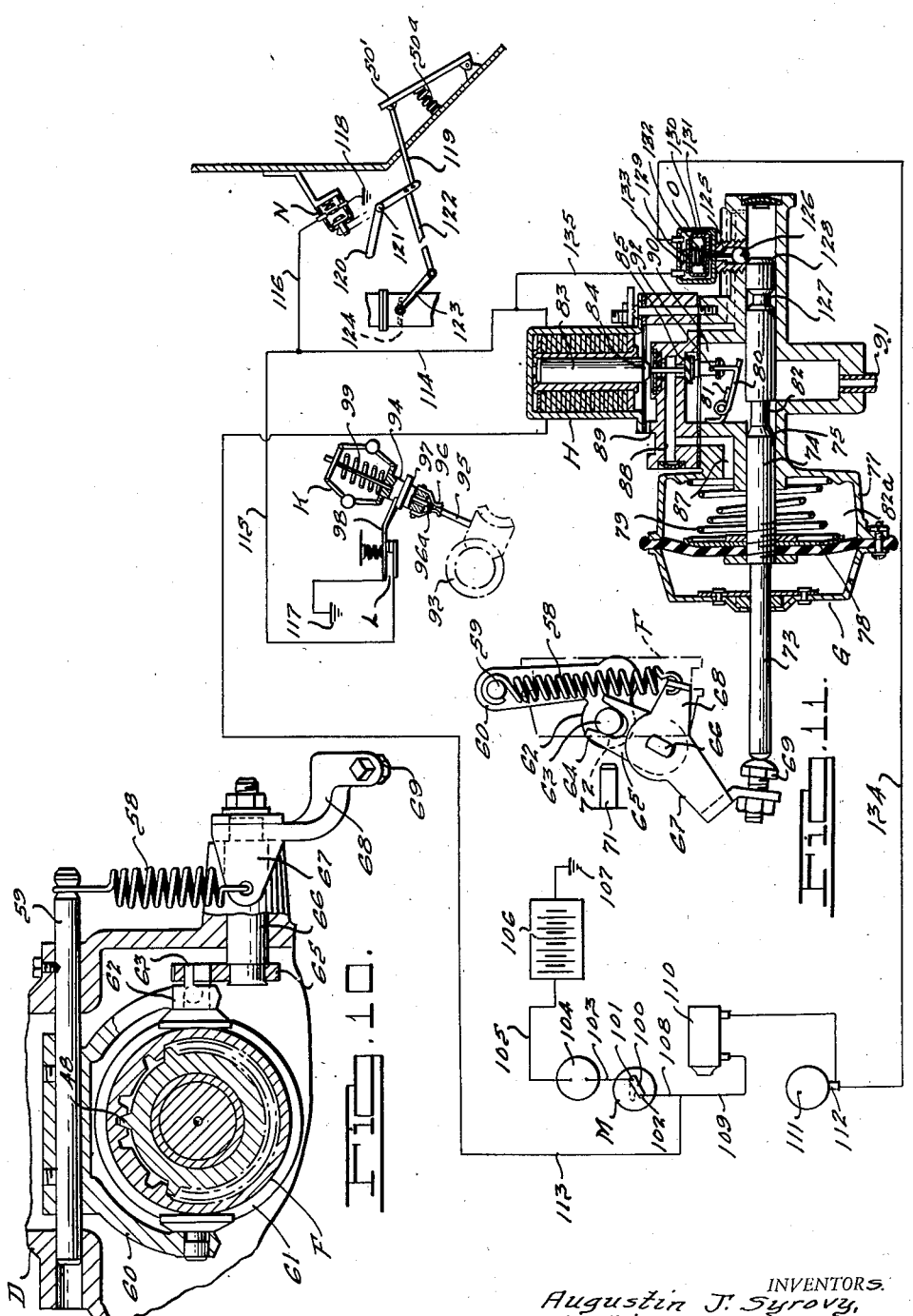

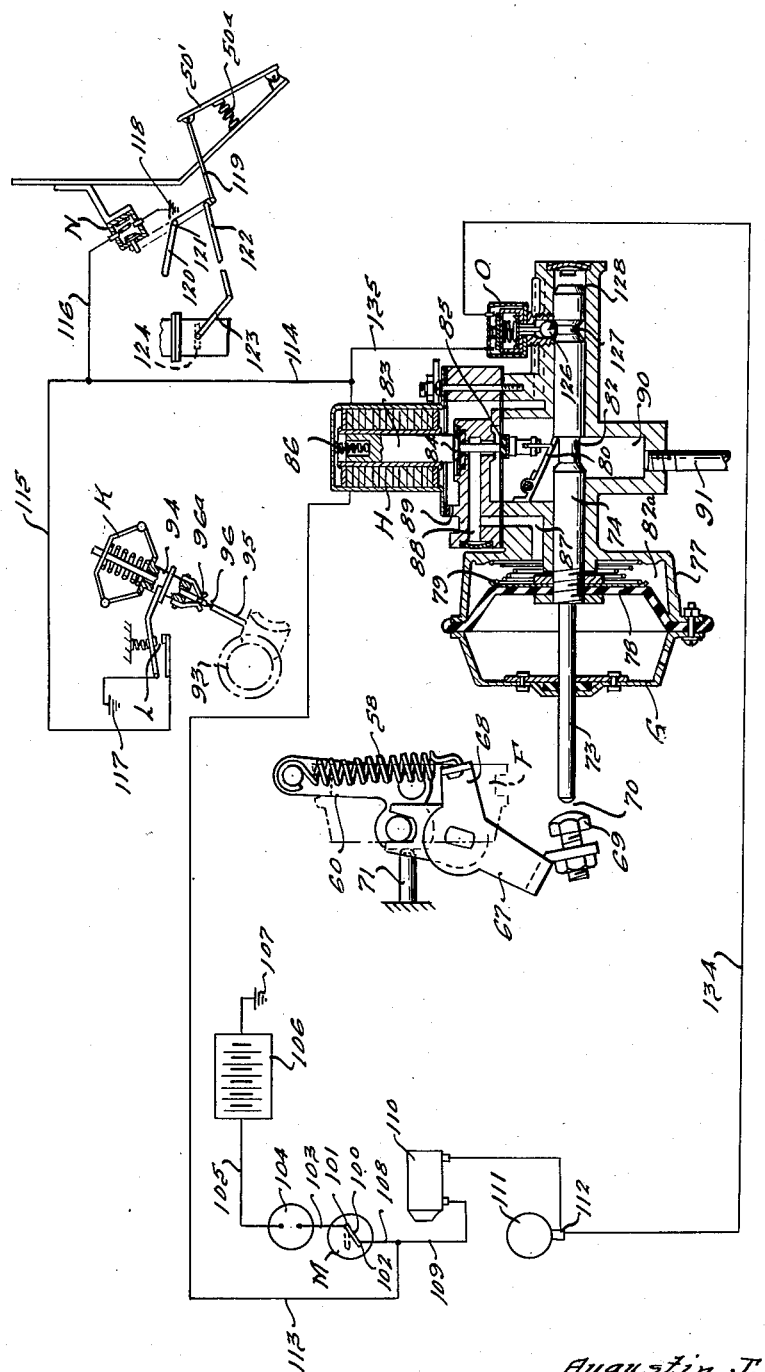

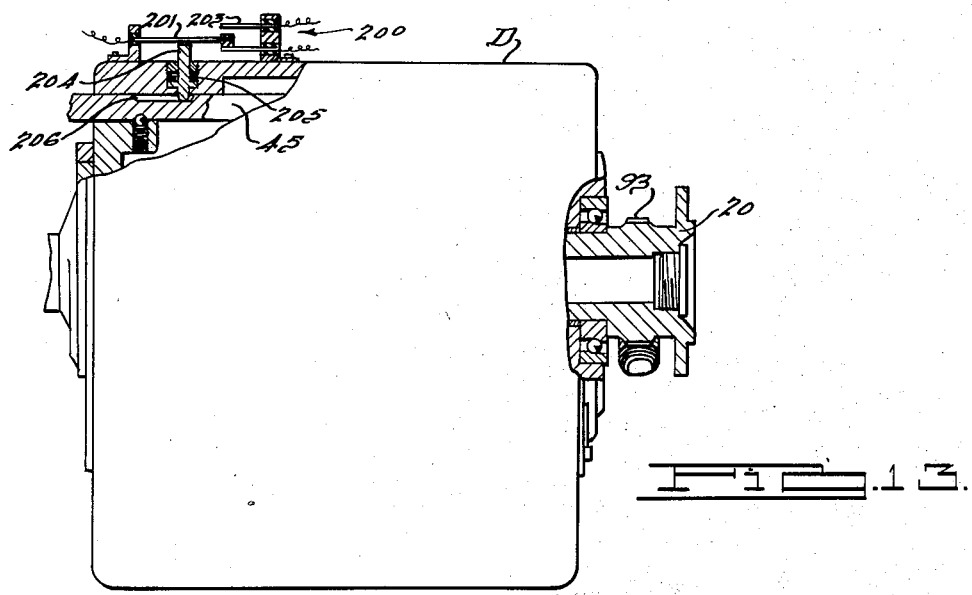
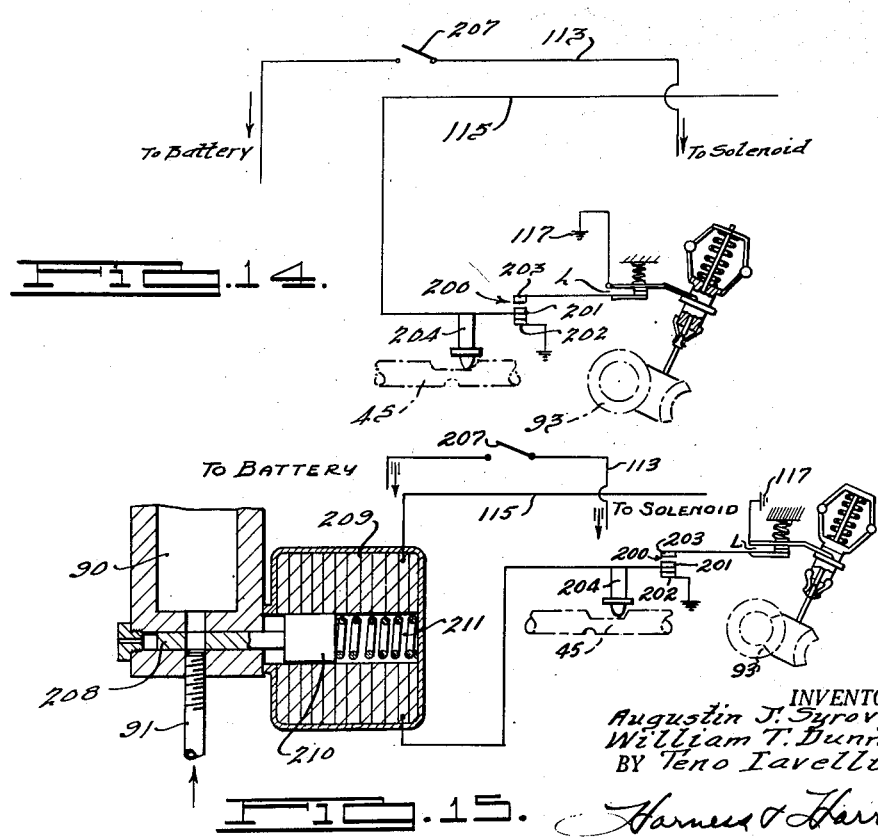

2,584,939

UNITED STATES PATENT OFFICE 2,584,939

POWER TRANSMISSION

Augustin J. Syrovy, William T. Dunn, and Teno Iavelli, Detroit, Mich., assignors to Chrysler Corporation, Highland Park, Mich., a corporation of Delaware Application April 17, 1944, Serial No. 531,382

28 Claims. (Cl. 74—336.5)

This invention relates to motor vehicles and refers more particularly to power transmission and control mechanism therefor.

In certain transmissions of the automatic or semi-automatic types, an overrunning device is provided in conjunction with speed controlled ratio change means so that when the vehicle is driven in one free-wheeling ratio up to a speed above the critical governor speed at which a step-up in the ratio to a two-way drive is accommodated and influenced by the governor control system, such step-up will take place by the driver releasing the accelerator pedal so that the overrunning device is brought into action thereby allowing the engine to freely coast and drop in speed. Some form of blocking control is usually provided to prevent the step-up from taking place, even when called for by the governor system, during vehicle drive and until the engine coast produces approximate synchronous rotation between the drive-control elements which engage each other to effect the step-up drive ratio. Also, it is generally desired to arrange the transmission gearing for two ranges of drive under manual or other control, and reverse gearing. One such transmission is disclosed, for example, in the copending application of Carl A. Neracher et al., Serial No. 335,310 filed May 15, 1940, now issued as Patent No. 2,455,943 of December 14, 1948.

In said prior transmissions, as typified by said Neracher et al. application, shifting or setting the transmission in each of the high and low ranges causes a free-wheeling action of the vehicle when driven below the critical governor speed, the step-up occurring from free-wheeling first to two-way second or from free-wheeling third to two-way fourth, depending on the setting for low or high range, when engine coast occurs as aforesaid from a vehicle driving speed above that at which the governor calls for the step-up. Such an arrangement entails certain objectional characteristics and it is the object of our invention to overcome such objectionable characteristics while preserving the fundamental beneficial functions and characteristics of such transmissions. Certain of these undesirable characteristics, which our invention overcomes, are as follows:

First, such prior transmissions introduce complication and expense in the provision of means for starting a dead engine by towing (either pushing or pulling) the vehicle as is desirable when the battery fails to turn the engine over. This difficulty is brought about because of the inherent free-wheeling condition in the forward starting transmission ratios in either low or high range, viz., free-wheeling first and third speeds. In order to provide the desired drive to the engine it has been deemed necessary to provide some means for effecting the engagement of the drive-control elements independently of the governor system to overrule or negative the effect of the overrunning device by obtaining a two-way drive setting. This usually entails a dash control connected by Bowden wire, levers, links, etc., with the transmission in appropriate manner. Furthermore, the provision of such dash control has been found to entail attempted use of the same under conditions other than intended, resulting in permanent damage to the transmission.

Second, where as is customary, the above mentioned dash control is arranged to effect manual engagement of the drive-control elements for obtaining the necessary two-way drive, the engine is driven in either second or fourth speed, depending on the range setting, whereas it would be more beneficial to enable drive of the engine in first speed so as to turn the engine as fast as possible for a given speed of vehicle tow. The inherent free-wheeling drive in first prevents its use for driving the engine.

Third, such prior transmissions do not enable use of the engine as a brake in the most favorable ratio during travel of the vehicle down steep grades. First speed being free-wheeling requires engine braking in second or fourth. Furthermore, the driver is required to first drive the vehicle in first or third in order to effect the aforesaid coast step-up to the two-way second or fourth.

Fourth, such prior transmissions provide a starting reverse drive ratio which is inherently free-wheeling and a step-up reverse ratio resulting from coast if the drive is above the critical speed of the governor. It is often undesirable and dangerous to free-wheel in reverse as well as to provide a reverse drive which is as fast as that resulting from the step-up on coast.

Our invention has, among its objects, the provision of means for overcoming the aforesaid difficulties and undesirable characteristics by a simple and inexpensive expedient free from additional complication, controls, and the like. In our preferred embodiment we accomplish our objects by a novel location of the overrunning device in such manner as to beneficially influence the various operating functions of the transmission without, however, disturbing the beneficial desirable characteristics of the transmission.

Further objects of our invention are to enable starting of a dead engine by drive in low or first without requiring lock-out or other complicated controls for the overrunning device; to enable use of the engine as a brake in the favorable low transmission ratio; and to provide for a two-way starting drive in reverse without inherent coast step-up in reverse.

Further advantages of our invention reside in an arrangement wherein the speed of all meshing gears is relatively low during direct drive; wherein torque distribution in the transmission is improved; and wherein simplification in the construction of the drive-control elements and blocking means is possible as it is not necessary with our arrangement to engage the drive-control elements in order to start a dead engine by towing the vehicle.

Further objects and advantages of our invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a sectional elevational view taken approximately as indicated by line 10—10 in Fig. 3 but showing only the upper portion of the transmission mechanism and particularly the lever operating mechanism for the automatic clutching sleeve when in its engaged position.

Fig. 11 is a diagrammatic view of the control mechanism for the automatic clutching sleeve, the latter being shown in its released position.

Fig. 12 is a similar view of the Fig. 11 mechanism corresponding to engaged position of the automatic clutching sleeve.

Fig. 13 is a side elevational view of the Fig. 3 transmission with parts of the casing broken away to show a control switch applied thereto as an addition to the Fig. 3 transmission.

Fig. 14 is a fragmentary view of the Fig. 12 wiring diagram modified to incorporate the Fig. 13 control switch.

Fig. 15 is a view generally similar to Fig. 14 but showing in sectional elevation a modified type of control comprising a solenoid operated valve.

While our control may be employed in conjunction with various types and arrangements of motor vehicle transmissions, especially where relatively movable engageable drive control elements are employed, in order to illustrate one driving system we have shown our invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to our transmission, pinion 28 is in constant mesh with a countershaft drive gear 34 which is splined or otherwise drivingly connected to the countershaft 35 which carries a low speed or low range countershaft gear 36 and a reverse gear 38. The countershaft freely journals a high range or high speed countershaft gear 37 and the countershaft has its forward end splined at 34a to receive gear 34 in positive drive relationship. Gear 37 has a forward extension 37a and interposed between this extension and the countershaft is a conventional type overrunning clutch E so arranged that when shaft 27 drives in its usual clockwise direction (looking from front to rear) then gear 34 and countershaft 35 will be driven counterclockwise and gear 37 will, if it tends to lag behind gear 34, be driven at the same speed as gear 34 through overrunning clutch E. However, when gear 34 tends to lag behind gear 37 then clutch E will automatically release whereby shaft 27, under certain conditions, may readily drop its speed while gear 37 continues to revolve.

Freely rotatable on shaft 20 are the low and high range driven or output gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means preferably under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, second and reverse speed ratio drives and neutral are under manual shift control of the vehicle driver, the main clutch C being released as by depressing pedal 29 or by freeing the engine from shaft 27 in any other convenient manner, in shifting into any one of these drives.

First or low is obtained by shifting sleeve 42 to the low range to clutch with teeth 43, the drive passing from engine A, through fluid coupling B, clutch C and shaft 27 to pinion 28, thence through gear 34 directly to countershaft 35. From the countershaft the drive is through gears 36, 39 and sleeve 42 to hub 41 and shaft 20. First is a two-way drive as it does not pass through the overrunning clutch E. This drive is a relatively slow speed drive of relatively great torque multiplication.

Second or intermediate is obtained by shifting sleeve 42 to the high range to clutch with teeth 44, the drive passing from the engine to the countershaft 35 as before, thence through the overrunning clutch E to gears 37, 40, sleeve 42 and hub 41 to shaft 20. Second is free-wheeling below the governor critical speed presently more apparent. This drive is relatively faster than the first or low drive and of lesser torque multiplication.

Reverse is a two-way drive and is obtained by shifting idler 47 into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from second to third which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in second, third or direct is obtained by the driver releasing the usual accelerator pedal 50' (Fig. 1) thereby allowing spring 50a to close the engine throttle valve and cause the engine to rapidly coast down. When this occurs, the engine along with shaft 27, pinion 28, gear 34 and the countershaft cluster all slow down, while shaft 20 along with gears 49 and 37 continue their speeds by accommodation of clutch E which now overruns. The engine slows down until teeth 49 are brought to approximate synchronism with sleeve F which thereupon automatically shifts to clutch with teeth 49 resulting in a two-way direct drive as follows: pinion 28 through sleeve F to gear 40 thence directly through sleeve 42 to shaft 20, clutch E overrunning. Direct is the fastest of the three drives.

Referring to Figs. 4 to 9 there is shown the blocking means for controlling clutching shift of sleeve F so as to limit clutching thereof to engine coasting and synchronous relationship of the step-up drive-control elements or clutching parts. Sleeve F is provided with a series of pairs of what may be termed long and short teeth 50, 51 certain of which may be bridged or joined together. A unitary blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and second, the speed of shaft 27 exceeds the speed of gear 40 so that, if sleeve F is fully released, the parts will be positioned as in Fig. 5 wherein the blocker teeth 53 are in axial alignment with the short teeth 51. If now the sleeve F is urged forwardly it will move to the Fig. 6 position of drive blocking and will remain in this blocked position as long as the engine drives the car in first or second.

If now the driver, during drive in first, releases the accelerator pedal the relationship is not altered because first is a two-way drive. However if the driver, during drive in second, releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in direct, the manually shiftable sleeve F having been set for second or high range prior to the clutching shift of sleeve F.

In the event that sleeve F is urged forwardly from its Fig. 6 position at a time when the gear 49 is rotating faster than pinion 28, then the blocker 52 will lag behind the sleeve and will be blocked by engagement of long teeth 50 with the blocker teeth 53 as shown in Fig. 9. This is referred to as the coast blocking condition and is possible under certain conditions in the high range. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in second. Then on releasing the accelerator pedal the sleeve F will synchronously clutch with teeth 49 during coast to step-up the drive to direct as aforesaid.

The transmission is provided with suitable motor means for controlling shift of sleeve F along with several control means. Referring particularly to Figs. 11 and 12, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H. The term "vacuum" is commonly used to denote pressures less than atmospheric and it is in this sense that we use this term and not in the strict sense of zero pressure or absolute vacuum.

Forward shift of sleeve F is effected, under control of motor G, by reason of a spring 58 (Fig. 10) having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66, the outboard end of which has fixed thereto a bell-crank follower lever member having lever arms 67 and 68. The end of lever 68 is connected to the lower end of spring 58 and lever 67 carries an adjustable abutment 69 for adjusting the lost-motion at gap 70 (Fig. 12) as will presently be apparent.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

Arranged for engaging the abutment 69 during its arcuate movement about the axis of shaft 66, is a thrust-imparting leader member in the form of a reciprocatory rod 73 having an enlarged central portion 74 slidably supported in the bore 75 of motor G.

Motor G comprises a cylinder 77 which contains a piston 78, herein illustrated as the diaphragm type. This piston has its outer portion secured to cylinder 77 and its central portion fixed to the rod 73, the piston and rod being urged forwardly in a direction to release sleeve F by a spring 79 which is much stronger than spring 58. A suitable type of releasable holding means is provided for rod 73 so as to releasably hold this rod and piston 78 rearwardly retracted to their Fig. 12 positions against the action of spring 79 and independently of the continuance of vacuum until it is desired to urge disengagement of sleeve F. This releasable holding means is illustrated in the form of a latch 80 which, under the action of a rat-trap spring 81, catches on the rearward shoulder of a detent 82 in rod portion 74 as in Fig. 12. At this time leader rod 73 moves rearwardly further than follower lever 67 by the amount of the aforesaid gap 70 such that on releasing latch 80 the rod 73 may move forwardly the amount of this gap without requiring sleeve F to move from its engaged position toward its disengaged position.

The vacuum supply to the working chamber 82a is under control of the aforesaid solenoid H which comprises an armature plunger 83 having valving parts 84, 85. In Fig. 11 the solenoid H is energized thereby raising plunger 83 against spring 86 (Fig. 12) to seat valve 85 and shut off the vacuum supply to chamber 82a and at the same time unseat valve 84 so as to vent this chamber through passage 87, chamber 88 and vent passage 89. When the solenoid is deenergized then spring 86 lowers plunger 83 thereby seating valve 84 to shut off vent 89 and open valve 85 as in Fig. 12 thereby opening chamber 82a to the engine intake manifold J through passage 87, chamber 88, chamber 90 and pipe 91.

A certain lost motion is provided between plunger 83 and the inwardly bent finger 92 of latch 80 so that when the plunger moves downwardly the latch may subsequently catch at detent 82 when vacuum operates piston 78, the parts then remaining in the Fig. 12 position independently of vacuum in chamber 82a until solenoid H is energized to release the latch and vent chamber 82a.

It is deemed preferable to provide a speed control on the energization of solenoid H so as to insure automatic release of sleeve F below a predetermined car speed and to accommodate automatic engagement of sleeve F above a predetermined car speed. Whenever the car is in forward high range driving condition the manual sleeve 42 is shifted forwardly to the high range so that by driving a governor from the countershaft 35 it is possible to provide a speed control operated proportionate to the speed of travel of the car when driven by the engine. Driven from countershaft gear 93 is a governor K of any suitable type, this governor operating a sleeve 94 outwardly along its drive shaft 95 as the car speed reaches a predetermined point.

It is deemed preferable to provide a governor control in conjunction with selected transmission and rear axle ratios of such arrangement that the following functions will be obtained. When the car is accelerated from rest in second, the governor should operate to call for the step-up at a predetermined car speed and should maintain this condition during engine retardation sufficient to synchronize the speeds of teeth 49 and sleeve F during which the governor speed is proportionately retarded. Therefore, a lag in the governor operation in response to acceleration and retardation of countershaft 35 is desirable. This may be obtained by reason of inherent friction in the governor parts but may be obtained in addition by detent control. It is further preferred to arrange the governor parts so that when the car is brought to a stop in direct, the governor will call for step-down with attendant ignition interruption at a car speed equivalent to an engine speed at or just below engine idling speed so that a reversal of torque at the teeth 49 is obtained to facilitate automatic release of sleeve F preparatory to starting the car in second as will presently be more apparent. This is expedited by the fluid coupling B which, in bringing the car to a stop in the usual manner, allows the engine to lag slightly behind the speed of the coupling runner 23 and parts connected thereto. As will presently be more apparent, the spring 79 may be of such force as to insure disengagement of sleeve F on bringing the car to a stop without requiring governor action to cause ignition interruption at or below engine idling speed especially as the engine torque is very low in the vicinity of its idling speed and with the accelerator pedal released. In order to insure governor functions as set forth above for the preferred arrangements, the breakaway of sleeve 94 during acceleration and retardation of the governor drive shaft 95, is under control of the respective detents 96 and 96a.

The sleeve 94 has a shoulder 97 engaged by the swinging switch piece 98 of the governor switch L. When the car is stationary the detent 96 is engaged and switch L is closed. As the car accelerates the governor eventually reaches its critical switch-opening speed and detent 96 releases thereby causing switch L to open attended by engagement of detent 96a. As the car slows down, the governor spring 99 releases detent 96a and restores the parts to the Fig. 11 position and by proportioning the various parts it is obvious that switch L may be made to function at desired speeds proportionate to car travel during drive in second and during stops in direct. As an example of one arrangement of governor operation and gearing arrangement, the governor may be made to open switch L during car acceleration in second speed ratio at approximately 14 M. P. H. (miles per hour), the switch L closing on stopping the car in direct at approximately 10 M. P. H.

The driver operated ignition switch is designated at M and comprises a conductor 100 which, in the Fig. 11 position showing the switch "on" or closed, electrically connects contacts 101 and 102. Contact 101 extends by conductor 103 to ammeter 104 and thence by conductor 105 to the usual storage battery 106 and thence to ground 107. Contact 102 has a conductor 108 extending by conductor 109 branching therefrom to the engine ignition system herein shown in part as comprising coil 110 and distributor 111 having the primary terminal 112.

A second conductor 113 branches from conductor 108 to the solenoid H and thence by conductor 114 to two conductors 115 and 116, the former extending to governor switch L and thence to ground 117. Conductor 116 extends to kickdown switch N and thence to ground 118. The switch N is normally open and is closed preferably by a full depression of accelerator pedal 50' acting through link 119 and a bell-crank lever 120 pivotally mounted at 121. Lever 120 actuates a link 122 which extends forwardly to adjust the engine throttle valve lever 123. When pedal 50' is thus depressed, the lever 123 is positioned to fully open the throttle valve 124 and as the throttle valve is adjusted in its wide-open range the lever 123 closes switch N to effect a stepdown in the transmission from direct to second by energizing the solenoid H.

The governor solenoid circuit is as follows: ground 107 to battery 106 thence by conductor 105 to ammeter 104 and by conductor 103 to ignition switch M. From switch M this circuit extends through conductors 108 and 113 to solenoid H and thence by conductors 114 and 115 to switch L and ground 117.

The kickdown solenoid circuit is the same as the governor solenoid circuit to conductor 114 whence this circuit extends by conductor 116 to kickdown switch N and ground 118.

The engine ignition circuit is the same as the governor solenoid circuit up to the conductor 108 whence this circuit extends by conductor 109 to coil 110 and distributor 111.

We provide any suitable means which functions to relieve the thrust-application between the teeth of sleeve F and the teeth 49 thereby facilitating movement of the drive-control sleeve element F from its Fig. 12 position of engaging relationship into its Fig. 11 position of disengaging relationship with respect to teeth 49. This relief means is arranged to function automatically in response to forward travel of rod 73 from a first position as in Fig. 12 to a second position of taking up gap 70 and to a third position as in Fig. 11 where it is the forwardmost limit of its travel corresponding to full disengaging travel of sleeve F.

In the present instance the relief means is shown in the form of a system of grounding the primary terminal 112 of the usual distributor 111 of the engine ignition system whereby the engine ignition may be momentarily rendered inoperative thereby unloading the torque at sleeve F to insure its release by spring 79.

This ignition interrupting system is under control of an interrupter switch O which is closed by plunger 125 and ball 126 whenever member 73 moves from its Fig. 12 position to its Fig. 11 position by reason of the enlarged rod end portion between detents 127 and 128. The switch O comprises a conductor bridge piece 129 carried by cup 130 which retains the spring seat 131 carried at the outer end of plunger 125. A spring 132 forms a yielding connection between cup 130 and seat 131 so that when ball 126 moves upwardly, the bridge piece 129 electrically connects the terminals of the switch O, the spring 132 yielding to accommodate any excess of movement of the ball beyond that required to engage the bridge piece 129 with the terminals. Ball 126 is prevented from falling inwardly beyond its position shown in Fig. 11 by reason of an inturned seat formed by peening the ball guide inwardly. A spring 133 yieldingly urges the assembly between the bridge piece 129 and ball 126 inwardly to the Fig. 11 position of these parts wherein switch O is open.

The ignition grounding circuit under control of interrupter switch O extends from the primary terminal 112 of the distributer 111 through conductor 134 to interrupter switch O. From switch O this grounding circuit extends through conductor 135 and thence to a suitable ground. In the illustrated arrangement this ground is provided either at 118 through conductors 114, 116 and kickdown switch N or else at 117 through conductors 115, 114 and governor switch L.

When the latch 80 is released, with the parts positioned as in Fig. 12, sleeve F being clutched, the spring 79 operates to move member 74 forwardly to close the gap 70 at the lost-motion between rod portion 73 and abutment 69. This movement of rod 74 to its position establishing thrust-transmitting relationship with respect to follower 67 causes detent 128 to move ball 126 outwardly thereby closing switch O and grounding the ignition system. When the ignition is thus interrupted, thereby relieving the thrust-application at the teeth of sleeve F, spring 79 then causes further movement of rod 74 to release sleeve F. During this further movement of rod 74, which is practically continuous with its movement closing gap 70, the detent 127 is aligned with ball 126 so that spring 133 can act to open the switch O to restore the ignition system to its normal operation.

In the operation of the mechanism, the car at standstill and with the ignition switch M closed and the engine idling will cause the solenoid H to be energized as in Fig. 11 because governor switch K is closed thereby establishing the governor solenoid circuit. Chamber 82a is vented and sleeve F disengaged. The driver shifts sleeve 42 usually to the high range and accelerates the car ordinarily above the critical speed of governor K thereby causing switch L to open to break the governor solenoid circuit. As vacuum builds up in the engine intake manifold J, either prior to release of the accelerator or at the time of coast, plunger 83 now being lowered by spring 86 because switch L is open, piston 78 will be operated by vacuum thereby moving rod 73 to its Fig. 12 latched position. As soon as the driver allows the engine to coast sufficiently to drop the speed of the teeth 49 as aforesaid, sleeve F will engage teeth 49 synchronously, to step-up the drive to direct third although the step-up will be delayed by the blocker 52 until engine coast thereby enabling drive in the slower driving ratio of second as long as desired.

If the car is initially accelerated in first by a shift of sleeve 42 to the low range, then a two-way drive is obtained and blocker 52 will always prevent clutching movement of sleeve F because the blocker will be maintained in drive blocked position inasmuch as the overrunning clutch E is not in the first speed drive train. Release of the accelerator pedal above the governor critical speed will not therefore have any effect on the blocker and while motor G will go through its cycles of operation it will not influence sleeve F. First is ordinarily used only in emergencies and for engine braking down steep grades. Ordinarily, especially where the car is equipped with a fluid coupling B, the sleeve 42 may be left in its high range and all starts and stops made without further shifting until the car is parked or reverse is desired. This is possible owing to slippage in the fluid coupling when stopping the car for a traffic light and is practicable because the fluid coupling allows high engine torque for favorable car acceleration and because governor K directs a downshift on bringing the car to rest. Thus there is automatically provided a favorable torque-multiplying gearing for starting in second.

Whenever the car is driving in direct third above the governor critical speed, a full depression of the accelerator pedal will cause the transmission to step-down to third or second, the engine rapidly speeding up to engage the overrunning clutch E, the transmission step-up back to direct third taking place on release of the accelerator pedal with attendant synchronization of sleeve F with teeth 49 accommodated by the overrunning clutch E.

When driving in direct and the accelerator pedal is fully depressed for the kickdown, switch N closes thereby energizing the kickdown solenoid circuit and causing solenoid H to raise plunger 83 and release latch 80 thereby venting chamber 82a. At this time the sleeve F is under driving torque from the engine operating under wide open throttle. However, when latch 80 is released, spring 79 operates rod 73 forwardly under accommodation of gap 70 to start the cycle of momentary ignition interruption by switch O thus insuring release of sleeve F whereupon the ignition is restored by switch O and the engine quickly speeds up to engage overrunning clutch E for establishing the second driving ratio.

On bringing the car to a stop when sleeve F is clutched in direct, the governor K closes governor switch L to energize solenoid H, vent chamber 82a and cause release of sleeve F so that the car will be started in second, assuming the manual sleeve 42 to be left in its forward high range shift position. This automatic step-down is accompanied by momentary interruption of the ignition system to facilitate disengagement of the sleeve F although, as aforesaid, this is not usually as important as during accelerator kickdown when the torque at teeth 49 is relatively high in comparison with the torque in the vicinity of engine idling speed.

When a shift to reverse is made, by meshing the reverse idler gear 47 with gears 38 and 46, the resulting drive is two-way independent of the overrunning clutch E. Hence, just as in the instance of first, the sleeve F cannot engage for the same reasons.

It will be apparent that first, reverse, and direct are all two-way drives without any free-wheeling condition. Furthermore, the transmission arrangement is such that there is only one condition when a change from vehicle drive to free-wheeling will result by reason of the driver releasing the depressed accelerator pedal. This one condition occurs only in second and only at relatively low car speeds because when the driver releases the accelerator at speeds above the governor critical speed, the two-way direct drive occurs in a brief time interval occupied by the engine retarding under closed throttle for the number of revolutions equivalent to the difference in its speeds between drive in second and direct. This arrangement therefore insures a safety feature protecting the car against undesired change at high speed from car drive to free-wheeling.

Furthermore, our arrangement provides for starting a dead engine by towing the car. The driver need only shift to first, this ratio being very favorable for fast turning of the engine for a given car towing speed, especially in view of the slip loss of the fluid coupling. It is not necessary to lock-out the overrunning clutch or effect engagement of sleeve F as the transmission system affords engine starting as well as step-up on coast by reason of the relationship of the overrunning clutch with respect to the various driving trains or paths.

In addition, low and reverse, being two-way drives, an effective use of the engine as a brake is afforded in both directions, reverse being protected against dangers incident to step-up on coast as in the aforesaid Neracher et al. application.

Further, the speed of all meshing gears is reduced approximately one-third when running in direct, as compared with the aforesaid Neracher et al. transmission, because the countershaft is driven by the same set of constant mesh gears at all times.

Figs. 13 and 14 illustrate a modification of the invention. It is preferable to drive the governor K from the transmission tail shaft 20 instead of from the countershaft 35 because the latter varies in speed with respect to the tail shaft depending upon the driving ratio. In Fig. 13, the governor drive gear 93 is formed on the tail shaft 20 and is omitted from the countershaft.

Figs. 13 and 14 illustrate another modification which, while not necessary to satisfactory operation of the transmission, is desirable from a safety standpoint. Referring for a moment to Fig. 3, it will be seen that when sleeve 42 is engaged with clutch teeth 43 for low speed drive through gears 36 and 39, the governor is driven and should the speed of the vehicle reach a value above the third speed step-up speed, there is nothing to prevent the sleeve F from engaging the clutch teeth 49 except the blocker 52. This condition obtains regardless of which shaft the governor is driven from. Of course, the sleeve F and gear 28 cannot synchronize while the shaft 20 is being driven through the low speed ratio or reverse gears because low and reverse speed drives are two-way drives; therefore, under normal conditions the blocker 52 will prevent forward shift of sleeve F even though the governor calls for shift. However, in extremely cold weather when the transmission lubricant is thick, or under other conditions of drive, the blocker 52 might stick in non-blocking position and permit the sleeve F to shift through the blocker. This would result in clashing of the sleeve teeth with teeth 49 and damage would undoubtedly result.

To prevent such an accidental occurrence, we have provided a switch 200, which is adapted to be mounted on top of the casing D or in some other convenient and accessible position for operation in response to shift of the rail 45. If no rail is provided, as is the case in some designs, the switch 200 may be operated by any part which shifts in connection with a shift of the sleeve 42 to low speed or neutral position. By comparing Fig. 14 with Figs. 11 and 12, it may be seen that the switch 200 may, if desired, be combined with the governor switch L. The switch is simply inserted in conductor 115 between switch L and conductors 114 and 116.

Switch 200 has an arm 201 which is adapted to engage a grounded contact 202 or a contact 203 connected to switch L. An operating pin 204 is urged downwardly by a spring 205 into a slot 206 cut in rail 45. So long as the rail is in neutral or low speed position, the switch arm 201 is in its illustrated position, in contact with grounded contact 202. The length of the slot 206 permits the switch to remain grounded through shift of the rail between neutral and low speed positions. As can be readily understood from the circuit diagram, the conductor 115 is grounded by switch 200 when rail 45 is in neutral or low; therefore, solenoid H cannot be deenergized regardless of operation of governor switch L or kickdown switch N. It follows then, that vacuum motor G cannot operate to call for a shift of sleeve F while rail 45 is in neutral or low speed positions.

When rail 45 is shifted to engage sleeve 42 with teeth 44 thereby establishing high speed range of drive, switch 200 is operated by pin (which then rides upon the thick portion of rail 45) to disengage arm 201 from ground contact 202 and engage it with contact 203. This restores the transmission control circuit to that of Figs. 11 and 12 and permits the governor and kickdown switch to control shifting of sleeve F until the rail 45 is again shifted out of high range position.

Fig. 14 also shows diagrammatically a manually operable switch 207 which may be provided if desired. This switch is preferably mounted on the vehicle instrument panel and when opened, as shown in Fig. 14, prevents energization of the solenoid H. If the solenoid H is not energized there can be no shifting of sleeve F under automatic control; however, if the vacuum system is functioning the sleeve F will immediately shift to third speed position and stay there until switch 207 is closed. Switch 207 is used only when it is desired to have the drive stay in third regardless of speed conditions or if the trouble develops in the control system and it is desired to prevent possible damage to the parts.

Fig. 15 illustrates a further modification. In this arrangement, a valve plate 208 is provided between the vacuum conduit 91 and the motor chamber 90 (see Figs. 11 and 12). This plate is controlled by a solenoid 209 having a core 210 attached to the plate and urged to the position shown by a coil spring 211. The solenoid 209 is adapted to be controlled by a rail switch like switch 200 or a manual switch like switch 207, or both.

When the solenoid 209 is deenergized as shown, the valve plate 208 is in such position that it does not interfere with the vacuum supply to the motor G. When the solenoid 209 is energized, the core 210 moves to the right and plate 208 closes off conduit 91 from chamber 90. Operation of the motor G to effect shift of sleeve F is thus made impossible. The Fig. 15 arrangement may be used instead of that of Figs. 13 and 14 for cutting out the automatic functioning of the transmission.

Having thus described preferred embodiments of our invention for purposes of illustration, we wish it understood that we do not wish to limit the invention in its broader aspects except as set forth in the claims appended below.

We claim:

1. In a motor vehicle drive having a driving shaft adapted to receive drive from the engine and a driven shaft axially aligned with, and adapted to transmit drive from, the driving shaft for driving the vehicle; a main drive pinion carried by said driving shaft; high and low range output gears each journalled for rotation on said driven shaft; countershaft gearing comprising a countershaft drive gear in constant mesh with said main drive pinion, a countershaft low range gear in constant mesh with said low range output gear, a countershaft drivingly connecting said countershaft gears, and a high range countershaft gear journalled for rotation on said countershaft and in constant mesh with said high range output gear; an overrunning clutch providing a one-way drive connection between said countershaft and said high speed countershaft gear; means operable for selectively clutching said high and low range output gears with said driven shaft thereby to selectively accommodate either a one-way relatively fast drive or else a two-way relatively slow drive from said driving shaft to said driven shaft; and means operable, when said selectively operable clutching means has been operated to accomodate said one-way drive, for clutching said high range output gear with said main drive pinion thereby to provide a step-up two-way direct drive from said driving shaft to said driven shaft.

2. In a motor vehicle drive according to claim 1 wherein the last said means comprises, two sets of clutch teeth respectively drivingly connected with said high range output gear and said main drive pinion, means for effecting shift of one of said sets of teeth into clutching engagement with the other of said sets of teeth, and synchronous blocking means operably associated with said shiftable teeth for controlling said clutching shift thereof as a function of the relative speeds of said sets of teeth such that said shiftable teeth are blocked so as to prevent their said clutching shift during acceleration of said driving shaft and such that said clutching shift of said shiftable teeth is accommodated when, from a condition of vehicle drive in said one-way drive, said driving shaft is allowed to slow down relative to said driven shaft to approximately the speed of said driven shaft.

3. In a motor vehicle drive according to claim 1 wherein the last said means comprises, two sets of clutch teeth respectively drivingly connected with said high range output gear and said main drive pinion, means for effecting shift of one of said sets of teeth into clutching engagement with the other of said sets of teeth, synchronous blocking means operably associated with said shiftable teeth for controlling said clutching shift thereof as a function of the relative speeds of said sets of teeth such that said shiftable teeth are blocked so as to prevent their said clutching shift during acceleration of said driving shaft and such that said clutching shift of said shiftable teeth is accommodated when, from a condition of vehicle drive in said one-way drive, said driving shaft is allowed to slow down relative to said driven shaft to approximately the speed of said driven shaft; and means operating in response to attainment of a predetermined speed of travel of the vehicle, when the vehicle is accelerated from rest by the engine in said one-way drive, for controlling operation of said step-up clutching means such that, when the vehicle is accelerated as aforesaid, said clutching shift of said shiftable teeth is accommodated at and above said predetermined speed but prevented at vehicle speeds below said predetermined speed.

4. In a motor vehicle drive according to claim 1 wherein the last said means comprises, two sets of clutch teeth respectively drivingly connected with said high range output gear and said main drive pinion, means for effecting shift of one of said sets of teeth into clutching engagement with the other of said sets of teeth, synchronous blocking means operably associated with said shiftable teeth for controlling said clutching shift thereof as a function of the relative speeds of said sets of teeth such that said shiftable teeth are blocked so as to prevent their said clutching shift during acceleration of said driving shaft and such that said clutching shift of said shiftable teeth is accommodated when, from a condition of vehicle drive in said one-way drive, said driving shaft is allowed to slow down relative to said driven shaft to approximately the speed of said driven shaft; and means operating in response to a predetermined speed of travel of the vehicle, when the vehicle is being brought to a stop in said two-way direct drive, for controlling operation of said step-up clutching means so as to effect disengagement of said shiftable set of teeth from the other of said sets of teeth.

5. In a motor vehicle drive having a driving shaft adapted to receive drive from the engine and a driven shaft axially aligned with, and adapted to transmit drive from, the driving shaft for driving the vehicle; a main drive pinion carried by said driving shaft; a low range output gear freely rotatable in opposite directions on said driven shaft; a countershaft, a pair of countershaft gears carried by the countershaft in constant two-way direct drive relationship with the countershaft, one of said countershaft gears being disposed in constant mesh with said pinion and the other of said countershaft gears being disposed in constant mesh with said low range output gear; a high range output gear concentric with said driven shaft and rotatable relatively thereto; means, including an overrunning clutch, providing a one-way intermediate speed drive between said pinion and said high range output gear; jaw clutch means for selectively clutching either of said high and low range output gears with said driven shaft; synchronizing blocking means controlling said selective clutching of said jaw clutch means; and means for clutching said high range output gear with said pinion thereby to provide a two-way direct drive between said shafts when said high range output gear is clutched with said driven shaft by said selective clutching means.

6. In a motor vehicle drive according to claim 5; and means operating in response to attainment of a predetermined speed of travel of the vehicle, when the vehicle is accelerated from rest in said one-way drive, for controlling operation of the last said clutching means such that, when the vehicle is accelerated as aforesaid, establishment of said two-way direct drive is accommodated at or above said predetermined speed but prevented at vehicle speeds below said predetermined speed.

7. In a motor vehicle drive according to claim 5; and means operating in response to a predetermined speed of travel of the vehicle, when the vehicle is brought to a stop in said two-way direct drive, for controlling operation of the last said clutching means so as to effect release thereof.

8. In a motor vehicle drive having a driving shaft adapted to receive drive from the engine and a driven shaft axially aligned with, and adapted to transmit drive from, the driving shaft for driving the vehicle; a main drive pinion carried by said driving shaft; a low range output gear loose on said driven shaft; means, including constant mesh countershaft gearing, providing a two-way low speed drive between said pinion and said low range output gear; a high range output gear concentric with said driven shaft and rotatable relatively thereto; means, including an overrunning clutch, providing a one-way intermediate speed drive between said pinion and said high range output gear; means for selectively clutching either of said high and low range output gears with said driven shaft; and means for clutching said high range output gear with said pinion thereby to provide a two-way direct drive between said shafts when said high range output gear is clutched with said driven shaft by said selective clutching means; the last said clutching means comprising, two sets of clutch teeth respectively drivingly connected with said high range output gear and said main drive pinion, means for effecting shift of one of said sets of teeth into clutching engagement with the other of said sets of teeth, and synchronous blocking means operably associated with said shiftable teeth for controlling said clutching shift thereof as a function of the relative speeds of said sets of teeth such that said shiftable teeth are blocked so as to prevent their said clutching shift during acceleration of said driving shaft and such that said clutching shift of said shiftable teeth is accommodated when, from a condition of vehicle drive in said one-way drive, said driving shaft is allowed to slow down relative to said driven shaft to approximately the speed of said driven shaft.

9. In a motor vehicle drive according to claim 8; and means operating in response to attainment of a predetermined speed of travel of the vehicle, when the vehicle is accelerated from rest by the engine in said one-way drive, for controlling operation of said gear and pinion clutching means such that, when the vehicle is accelerated as aforesaid, said clutching shift of said shiftable teeth is accommodated at and above said predetermined speed but prevented at vehicle speeds below said predetermined speed.

10. In a motor vehicle drive according to claim 8; and means operating in response to a predetermined speed of travel of the vehicle, when the vehicle is being brought to a stop in said two-way direct drive, for controlling operation of said gear and pinion clutching means so as to effect disengagement of said shiftable set of teeth from the other of said sets of teeth.

11. A change speed transmission comprising coaxial drive and driven shafts, a countershaft, a speed reduction power train including gears drivingly connecting the drive shaft with the countershaft, driving means comprising a pair of constantly meshed gears for drivingly connecting the countershaft with the driven shaft and including an overrunning clutch device in series therewith, one of said constantly meshed gears being journalled for rotation relatively to and coaxially on said driven shaft, clutch means for releasably connecting said journalled gear non-rotatively with the driven shaft, and a clutch comprising engageable counterparts respectively non-rotatively carried by said journalled gear and the drive shaft, and said clutch counterparts being engageable to establish a direct drive between the drive and driven shafts through said journalled gear and clutch means while shunting said overrunning clutch device.

12. A change speed transmission comprising coaxial drive and driven shafts, a countershaft, a two-way-drive power train interconnecting said drive shaft and said countershaft to enable the former to drive the latter, a plurality of members independently rotatable on the driven shaft, two pairs of gear trains each directly driven by the countershaft at points spaced from each other axially of the countershaft for rotating said independently rotatable members at different speeds, one of said gear trains including a one-way-drive device for transmitting one-way drive to one of said independently rotatable members from the drive shaft, clutch means operable to establish a driving connection between said one of said independently rotatable members and the drive shaft, and additional means for selectively effectuating two-way driving connections between each of said independently rotatable members and said driven shaft.

13. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure for rotation freely in opposite directions relative to each other and said driven structure; clutch means for selectively clutching said driven gears to said driven structure; clutch means for connecting one of said driven gears with said driving structure; a gear drivingly carried by said countershaft in mesh with the other of said driven gears; a second gear journalled on said countershaft in mesh with said one of said driven gears; and a one-way overrunning driving connection between said countershaft and said second countershaft gear.

14. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different forwardly driving speed ratios each different from said 1 to 1 ratio; said means including a countershaft; a two-way drive between said driving structure and said countershaft; a pair of driven gears each journalled on said driven structure for rotation in a forwardly drive direction freely with respect to said driven structure; clutch means for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; and second clutch means associated with said other driven gear for clutching this gear directly to said driving structure.

15. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means including clutch parts respectively associated with said driving structure and with said other driven gear for clutching this gear directly to said driving structure; power means for operating said second clutch means to effect said clutching of said other gear with said driving structure and means for automatically rendering said power means inoperable when said first clutch means has been operated to clutch said one driven gear to the driven structure.

16. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means associated with said other driven gear for clutching this gear directly to said driving structure; power means for operating said second clutch means, said power means including an electromagnetic control device; and means for so controlling said device as to render said power means inoperable when said one gear is connected with said driven structure through the first said clutch means.

17. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means operable for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means associated with said other driven gear for clutching this gear directly to said driving structure; power means for operating said second clutch means, said power means including an electromagnetic control device; and switch means operable for controlling operation of said electromagnetic control device; and means for operating said switch means in response to operation of the first said clutch means.

18. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means operable for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means associated with said other driven gear for clutching this gear directly to said driving structure; power means for operating said second clutch means; said power means including a differential pressure fluid actuated motor; and means for controlling operation of said motor in response to operation of the first said clutch means.

19. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means operable for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means associated with said other driven gear for clutching this gear directly to said driving structure; power means for operating said second clutch means; said power means including a differential pressure fluid actuated motor, a valve for controlling admission of pressure fluid to said motor, and a solenoid for controlling said valve; and means for controlling said solenoid as a function of said selective clutching operation of the first said clutch means.

20. In combination with a power transmission having a drive shaft and a driven shaft, means for connecting said shafts for low range forward driving ratio; means for connecting said shafts for high range forward driving ratio; said last means including means for clutching said shafts for direct drive therebetween; a shiftable clutch sleeve for establishing said respective ranges; electrical means for controlling the direct drive clutching means; and means operable in response to shift of said sleeve out of high range position and into low range position for rendering said direct drive clutching means inoperable.

21. In combination with a power transmission having a drive shaft and a driven shaft, means for connecting said shafts for low range forward driving ratio; means for connecting said shafts for high range forward driving ratio; said last means including means for clutching said shafts for direct drive therebetween; a shiftable clutch sleeve for establishing said respective ranges; electrical means for controlling the direct drive clutching means; and switch means operable in response to shift of said sleeve for selectively rendering said electrical means operable and inoperable.

22. In a power transmission for driving a vehicle having an engine, a driving structure adapted to be driven by the engine; a driven structure adapted to drive the vehicle; means for driving the driven structure from the driving structure at a 1 to 1 speed ratio or at either of several relatively different speed ratios each different from said 1 to 1 ratio; said means including a countershaft; a two-way drive between said driving structure and said countershaft; a pair of driven gears journalled on said driven structure; clutch means for selectively clutching said driven gears to said driven structure; a gear drivingly carried by said countershaft in mesh with one of said driven gears; a second gear journalled on said countershaft in mesh with the other of said driven gears; a one-way overrunning driving connection between said countershaft and said second countershaft gear; second clutch means comprising engageable clutch parts respectively drivingly connected with said driving structure and with said other driven gear, one of said clutch parts being movable relative to the other from a position of relative disengagement with respect to said other clutch part to a position of clutching engagement therewith for directly drivingly connecting said other driven gear with said driving structure; and means for controlling movement of said one clutch part to maintain said clutch parts in relatively disengaged relationship with respect to each other during all conditions of vehicle operation when said one driven gear is in a condition of connection with said driven structure through the first said clutch means.

23. A change speed transmission comprising coaxial driving and driven shafts; a countershaft; means providing a two-way drive connection between said driving shaft and said countershaft; a relatively slow speed forwardly driving gear carried by said countershaft for drive therewith; means providing a releaseable two-way drive connection between said low speed countershaft gear and said driven shaft; said releaseable two-way drive connection providing, in series with the first said two-way drive connection, a two-way relatively slow speed reduction drive from said driving shaft to said driven shaft; a driving element rotatably mounted on said driven shaft; clutch means for releasably connecting said element in two-way drive relationship with the driven shaft; clutch means for releasably connecting said element in two-way drive relationship with said driving shaft; means providing a one-way drive connection between said countershaft and said element; said one-way drive connection providing, in series with the first said two-way drive connection and the first said clutch means, a one-way relatively fast speed reduction drive from said driving shaft to said driven shaft; said element providing, in series with the first and second said clutch means, a two-way direct drive from said driving shaft to said driven shaft.

24. A change speed transmission according to claim 23 and means providing a releaseable two-way reverse drive connection between said countershaft and said driven shaft; said two-way reverse drive connection providing, in series with the first said two-way drive connection, a two-way reverse drive from said driving shaft to said driven shaft.

25. A change speed transmission comprising coaxial driving and driven shafts; an element rotatably mounted on said driven shaft; a countershaft; gearing providing a constant two-way drive connection between said driving shaft and said countershaft; a one-way drive between said countershaft and said element; and means for releasably clutching said element directly with said driven shaft or in series with both of said shafts.

26. A change speed transmission comprising coaxial drive and driven shafts, a countershaft, a two-way drive power train constantly interconnecting one of said coaxial shafts with said countershaft for driving the same, a pair of members freely mounted on the other of said coaxial shafts such that each of said members is freely rotatable in opposite directions relative to said other shaft and relative to the other of said pair of members, a pair of means driven by said countershaft for respectively rotating said freely rotatable members at relatively different speeds, one of said pair of means comprising a one-way drive device, clutch means operable to connect one of said freely rotatable members with said one shaft, and additional clutch means for selectively connecting either of said freely rotatable members with said other shaft.

27. A change speed transmission comprising coaxial drive and driven shafts, a countershaft, a power train drivingly disposed between the drive shaft and the countershaft, a plurality of power trains of different speed ratio alternatively establishable between the countershaft and the driven shaft for operation in series with said drivingly disposed power train, the faster of said plurality of power trains including an overrunning clutch device in series therewith, the other of said plurality of power trains including a member mounted on said driven shaft and being freely rotatable in opposite directions relative to said driven shaft, and clutch means operable to connect said freely rotatable member with the driven shaft thereby establishing a two-way drive between said drive and driven shafts through said drivingly disposed power train and said other of said plurality of power trains.

28. In a motor vehicle drive having a driving shaft adapted to receive drive from the engine and a driven shaft axially aligned with, and adapted to transmit drive from, the driving shaft for driving the vehicle; a main drive pinion carried by said driving shaft; high and low range output gears each mounted on and being freely rotatable relative to said driven shaft; countershaft gearing means providing a constant two-way drive connection between said pinion and said low range output gear; countershaft gearing means providing a one-way drive connection between said pinion and said high range output gear; means for selectively clutching either of said high and low range output gears for two-way drive connection with said driven shaft; and means for clutching said high range output gear with said pinion.

AUGUSTIN J. SYROVY.
WILLIAM T. DUNN.
TENO IAVELLI.

REFERENCES CITED

The following references are of record in the file of this patent:

UNITED STATES PATENTS

| Number | Name | Date |
|---|---|---|
| 1,396,512 | Fergusson | Nov. 8, 1921 |
| 1,969,561 | Keller | Aug. 7, 1934 |
| 2,012,296 | Banker | Aug. 27, 1935 |
| 2,133,548 | Lassiter | Oct. 18, 1938 |
| 2,342,138 | Gilfillan | Feb. 22, 1944 |
| 2,342,960 | Neracher et al. | Feb. 29, 1944 |
| 2,366,655 | Russey | Jan. 2, 1945 |
| 2,373,453 | Brunken | Apr. 10, 1945 |
| 2,449,964 | Banker | Sept. 21, 1948 |